United States Patent
Suetaka et al.

(10) Patent No.: US 7,403,776 B2
(45) Date of Patent: Jul. 22, 2008

(54) MOBILE COMMUNICATION TERMINAL FOR TRANSMISSION OF ELECTRONIC MAIL IN A DIGITAL MODE

(75) Inventors: Tatsuya Suetaka, Sagamihara (JP); Yoichi Nagashima, Hachioji (JP); Masataka Yamashita, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 558 days.

(21) Appl. No.: 10/105,430

(22) Filed: Mar. 26, 2002

(65) Prior Publication Data

US 2002/0137492 A1 Sep. 26, 2002

(30) Foreign Application Priority Data

Mar. 26, 2001 (JP) ............... 2001-087523

(51) Int. Cl.
*H04Q 7/20* (2006.01)
*H04M 1/00* (2006.01)

(52) U.S. Cl. ............. 455/432.3; 455/466; 455/553.1

(58) Field of Classification Search ............. 455/33.1, 455/89, 433, 466, 553.1, 432.3
See application file for complete search history.

(56) References Cited

U.S. PATENT DOCUMENTS

| | | | |
|---|---|---|---|
| 5,335,355 A * | 8/1994 | Tanaka et al. ............ 455/553.1 |
| 5,493,693 A * | 2/1996 | Tanaka et al. ............ 455/403 |
| 5,526,401 A * | 6/1996 | Roach et al. ............ 455/426.1 |
| 5,564,077 A * | 10/1996 | Obayashi et al. ........ 455/553.1 |
| 5,642,378 A * | 6/1997 | Denheyer et al. ........... 375/216 |
| 5,710,986 A * | 1/1998 | Obayashi et al. ........ 455/553.1 |
| 5,797,096 A * | 8/1998 | Lupien et al. ............ 455/433 |
| 5,878,351 A * | 3/1999 | Alanara et al. ............ 455/466 |
| 6,014,561 A * | 1/2000 | Molne ....................... 455/419 |
| 6,058,316 A * | 5/2000 | Takahashi ................ 455/552.1 |
| 6,061,572 A * | 5/2000 | Laiho ........................ 455/466 |
| 6,119,003 A * | 9/2000 | Kukkohovi ............. 455/435.2 |
| 6,151,507 A * | 11/2000 | Laiho et al. ................. 455/466 |
| 6,163,704 A * | 12/2000 | Joong et al. ................. 455/466 |
| 6,434,400 B1 * | 8/2002 | Villevieille et al. ...... 455/550.1 |
| 6,456,858 B1 * | 9/2002 | Streter ..................... 455/552.1 |

(Continued)

FOREIGN PATENT DOCUMENTS

JP 9-163452 6/1997

(Continued)

OTHER PUBLICATIONS

Notification of Reasons for Rejection from Japanese Patent Office mailed on Sep. 27, 2005, in Japanese Patent Application No. 2001-087523.

*Primary Examiner*—Fan Tsang
*Assistant Examiner*—Lisa Hashem
(74) *Attorney, Agent, or Firm*—Finnegan, Henderson, Farabow, Garrett & Dunner, L.L.P.

(57) ABSTRACT

When electronic mail transmitting operation is performed, it is checked whether the standby mode is the digital mode. If the standby mode is not the digital mode, processing for changing the standby mode from the analog mode to the digital mode is executed. When the standby mode is changed to the digital mode, the electronic mail is transmitted through a digital channel. If the standby mode cannot be changed to the digital mode, the transmission electronic mail is stored in a memory, and message hold transmission control is executed afterward.

17 Claims, 3 Drawing Sheets

U.S. PATENT DOCUMENTS 6,597,917 B1 * 7/2003 Meuronen ................... 455/466
6,957,068 B2 * 10/2005 Hutchison et al. ........ 455/435.2
7,130,620 B2 * 10/2006 Forman et al. ........... 455/414.2

FOREIGN PATENT DOCUMENTS

| | | |
|---|---|---|
| JP | 11-46245 | 2/1999 |
| JP | 11-163920 | 6/1999 |
| JP | 11-331178 | 11/1999 |
| JP | 2000-197134 | 7/2000 |
| JP | 2000-216908 | 8/2000 |
| JP | 2001-53897 | 2/2001 |

* cited by examiner

MOBILE COMMUNICATION TERMINAL FOR TRANSMISSION OF ELECTRONIC MAIL IN A DIGITAL MODE

CROSS-REFERENCE TO RELATED APPLICATIONS

This application is based upon and claims the benefit of priority from the prior Japanese Patent Application No. 2001-087523, filed Mar. 26, 2001, the entire contents of which are incorporated herein by reference.

BACKGROUND OF THE INVENTION

1. Field of the Invention

The present invention relates to a mobile communication terminal which performs radio communication with a base station by selectively using a plurality of communication modes.

2. Description of the Related Art

As a mobile communication terminal, a mobile communication terminal of a so-called dual mode type is available, which performs radio communication by selectively using an analog communication mode and a digital communication mode in accordance with the communication mode used by a base station. With the use of a terminal of the type, the user can perform radio communication with one terminal even in an area where only a base station conforming to an analog communication mode such as AMPS (Advanced Mobile Phone Service) is installed and an area where only a base station conforming to a digital communication mode such as the TDMA (Time Division Multiple Access) mode or CDMA (Code Division Multiple Access) mode is installed. That is, the mobile communication terminal is very convenient.

An increasing number of mobile communication terminals such as portable telephones and PDA (Personal Digital Assistants) have an electronic mail communication function as a well as a speech function. Electronic mail services generally include an Internet mail service via the Internet and a short message service (SMS) of transmitting electronic mail between mobile communication terminals in accordance with a protocol unique to a carrier. All these services use a digital communication mode.

For this reason, when a user tries to transmit/receive electronic mail by using a mobile communication terminal of the dual mode type described above, he/she cannot transmit or receive any electronic mail while a base station conforming to an analog communication mode is captured. In such a case, the user must try to switch to a digital communication mode or transmitting or receiving operation again after the communication mode is switched to the digital communication mode. That is, cumbersome operation is required.

BRIEF SUMMARY OF THE INVENTION

It is an object of the present invention to provide a mobile communication terminal which can transmit or receive electronic mail without making a user switch communication modes by himself/herself.

In order to achieve the above object, according to an aspect of the present invention, in a mobile communication terminal which performs radio communication by selecting one of first and second communication modes in accordance with a communication mode of a base station, when a request to communicate electronic mail is input, it is checked whether the selected communication mode is the first communication mode capable of communicating the electronic mail. If it is determined that the selected communication mode is the second communication mode incapable of communicating electronic mail, processing for changing the selected communication mode to the first communication mode is executed.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

A mobile communication terminal according to an embodiment of the present invention will be described below with reference to the views of the accompanying drawing. Note that in this embodiment, as an electronic mail distribution service, a so-called short message service (SMS) will be described, in which electronic mail is transmitted between portable telephone terminals in accordance with a protocol unique to a carrier.

Figure 1:
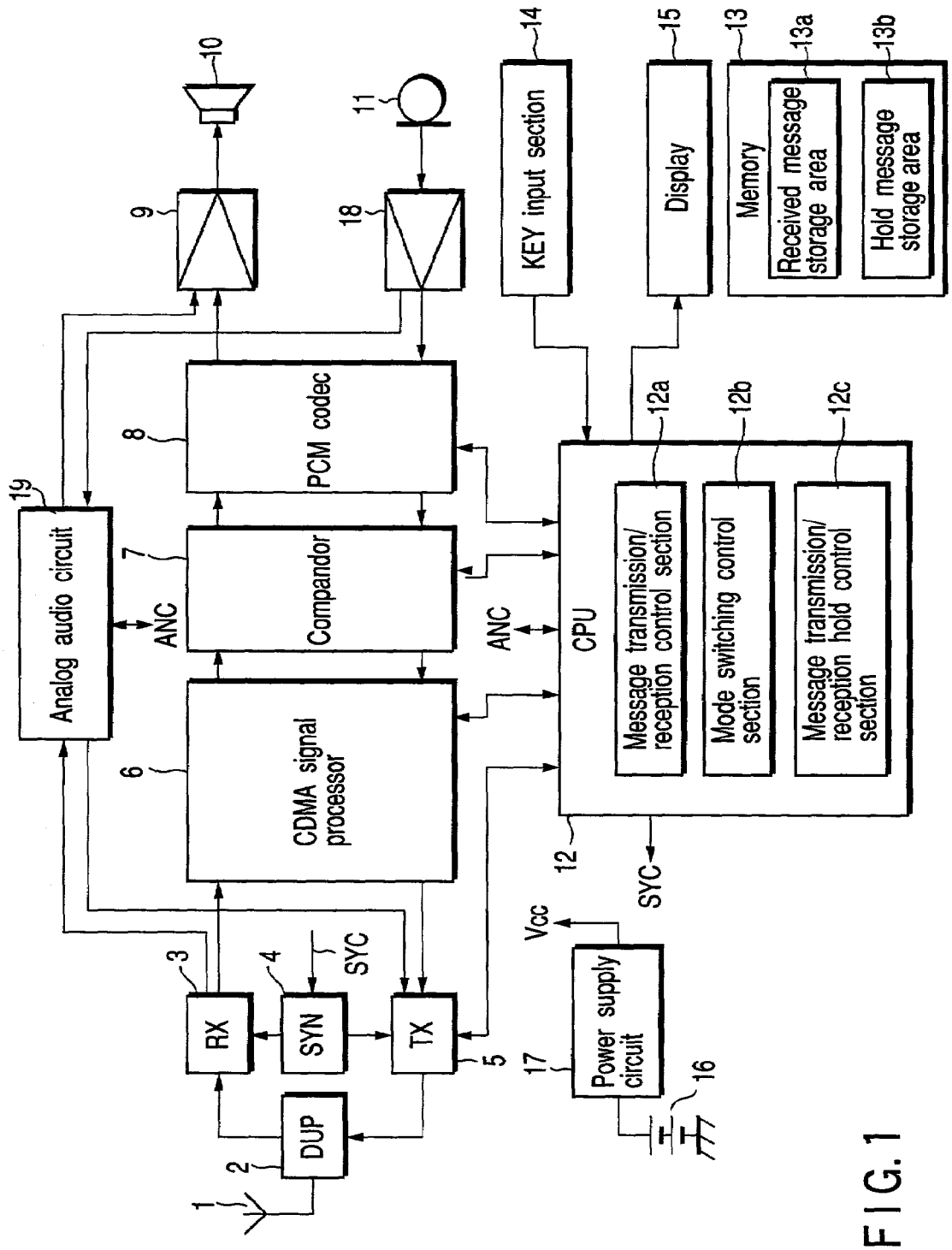
FIG. 1 is a block diagram showing a mobile communication terminal according to an embodiment of the present invention.

FIG. 1 is a block diagram showing the functional arrangement of a portable telephone terminal according to an embodiment of the present invention. This portable telephone terminal is of a dual mode type corresponding to an analog communication mode (analog mode) such as AMPS and a digital communication mode (digital mode) based on the CDMA mode.

A radio signal transmitted from a base station (not shown) is received by an antenna 1. This signal is then input to a reception circuit (RX) 3 through a duplexer (DUP) 2. The reception circuit 3 mixes the received radio signal with a local oscillation signal output from a frequency synthesizer (SYN) 4 to frequency-convert (downconvert) the radio signal into an intermediate-frequency signal. This intermediate-frequency signal is quadrature-modulated to output a reception baseband signal. Note that the frequency of a local oscillation signal generated by the frequency synthesizer 4 is designated by a control signal SYC from a CPU 12.

The reception baseband signal is input to a CDMA signal processor 6. The CDMA signal processor 6 has a RAKE receiver. The RAKE receiver despreads signals from a plurality of paths which are contained in the above reception baseband signal with spreading codes. The despread signals from the respective paths are combined with each other upon phase matching. As a consequence, reception packet data in a predetermined transmission format is obtained. This reception packet data is input to an expander/compressor 7 (to be referred to as a compandor hereinafter).

The compandor 7 demultiplexes the reception packet data output from the CDMA signal processor 6 by using a multiplexer/demultiplexer on a medium basis. The compandor 7 then performs decoding processing for each of the demultiplexed media data. If, for example, audio data is contained in the reception packet data, the audio data is decoded by a speech in the compandor 7. If video data is contained in the reception packet data, the video data is decoded by a video in the compandor 7. The digital audio signal obtained by this decoding processing is input to a PCM codec 8, and the digital video signal is input to the CPU 12. If text data such as mail (including a short message) is contained in the reception packet data, the text data is input to the CPU 12.

The PCM codec 8 PCM-decodes the digital audio signal output from the compandor 7 to output an analog audio signal. This analog audio signal is amplified by a receiving amplifier 9 and output from a speaker 10.

The CPU 12 displays the digital video signal output from the compandor 7 on an LCD display 15 by using the video memory. The text data such as mail is stored in a memory 13 and displayed on the LCD display 15. If, for example, an automatic answering mode is set through a key input section (KEY) 14, audio data and video data are received and stored in the memory 13 before decoding processing in the compandor 7.

If an external information terminal such as a personal digital assistance (PDA) or notebook personal computer is connected to the portable telephone terminal, data is transferred from the CPU 12 to the above external information terminal through an external interface (not shown) before decoding processing in the compandor 7.

The speech from a speaker which is input to a microphone 11 is amplified to an appropriate level by a receiving amplifier 18 and subjected to PCM coding processing in the PCM codec 8. The resultant digital audio signal is input to the compandor 7. The video signal sensed by a camera (not shown) is digitalized by the CPU 12. The resultant signal is input to the compandor 7. Note that the text data such as mail created by the CPU 12 is also input from the CPU 12 to the compandor 7.

The compandor 7 detects the energy amount of input speech from the digital audio signal output from the PCM codec 8, and determines a transmission data rate on the basis of the detection result. The compandor 7 then codes the above digital audio signal into a signal in a format corresponding to the above transmission data rate, thus creating audio data. The compandor 7 also creates video data by coding the digital video signal output from the CPU 12. These speech data and image data are packeted by the multiplexer/demultiplexer in accordance with a predetermined transmission format. This transmission packet data is output to the CDMA signal processor 6. Note that when text data such as mail (including a short message) is output from the CPU 12 as well, the text data is multiplexed with the above transmission packet data.

The CDMA signal processor 6 performs spread spectrum processing for the transmission packet data output from the compandor 7 by using the spreading code assigned to the transmission channel. The resultant output signal is output to a transmission circuit (TX) 5. The transmission circuit 5 modulates the spread signal by using a digital modulation mode such as the QPSK mode. The transmission signal generated by this digital modulation is combined with the local oscillation signal generated by the frequency synthesizer 4 to frequency-convert (upconvert) the transmission signal into a radio signal. This radio signal is RF-amplified to the transmission power level designated by the CPU 12. This amplified radio signal is supplied to the antenna 1 through the duplexer 2 and transmitted from the antenna 1 to a connected base station.

The key input section 14 includes function keys, e.g., a send key, end key, power key, volume control key, and mode designation key, in addition to a dial key. The LCD display 15 also has LED elements. As described above, transmission/reception video data and mail text data are displayed on the LCD display 15. In addition, a phone book, the telephone number of a distant terminal, a transmission/reception log, the operation state of the self-terminal, and the like are also displayed on the LCD display 15. The LED elements are used to notify termination and display the charged state of a battery 16. Reference numeral 17 denotes a power supply circuit which generates a predetermined operating power voltage Vcc on the basis of an output from the battery 16 and applies it to each circuit section.

The memory 13 includes a speech data storage area, received message storage area 13a, and hold message storage area 13b. The speech data storage area is used to perform automatic unattended recording and replay of audio signals. A received short message is stored in the received message storage area 13a. When transmission hold control is performed on a short message, the short message is stored in the hold message storage area 13b.

The CPU 12 has a message transmission/reception control section 12a, automatic mode switching control section 12b, and message transmission/reception hold control section 12c as new control functions according to the present invention.

The message transmission/reception control section 12a has the function of creating a short message in accordance with user operation and transmitting the created short message and the function of receiving a short message from a center (not shown).

The automatic mode switching control section 12b checks, upon transmission/reception of the short message, whether the currently set standby mode is the analog or digital mode. If the analog mode is set, the automatic mode switching control section 12b searches neighboring base stations to capture an optimal digital base station, and changes the standby mode to the digital mode. The automatic mode switching control section 12b then instructs the message transmission/reception control section 12a to transmit the short message.

The message transmission/reception hold control section 12c checks whether the automatic mode switching control section 12b has changed the analog mode to the digital mode. If such a change is not made, the message transmission/reception hold control section 12c holds transmission/reception of the above short message. When the message transmission/reception hold control section 12c monitors a change to the digital mode afterward and confirms that the standby mode has changed to the digital mode, the section 12c instructs the message transmission/reception control section 12a to transmit the short message.

Figure 2:
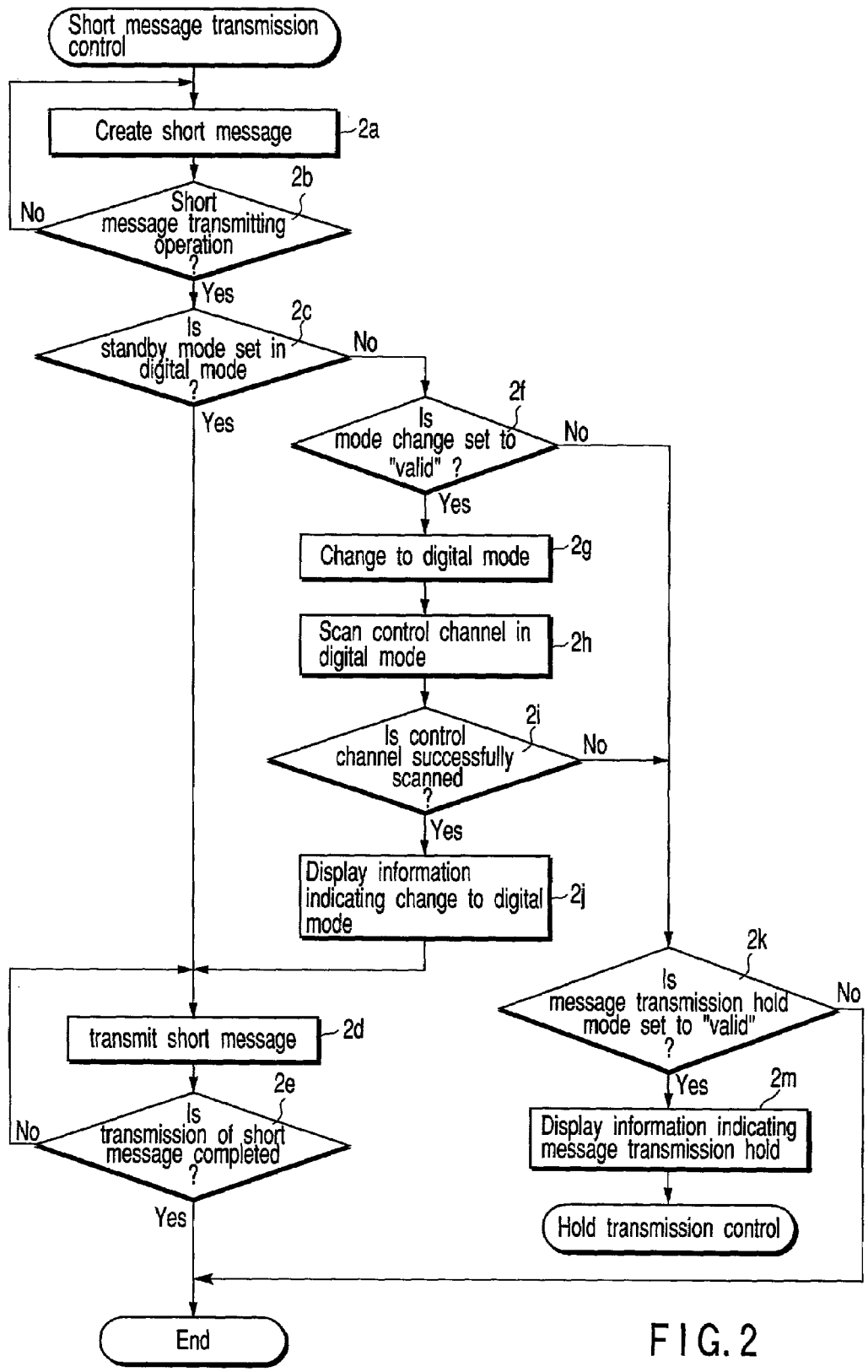
FIG. 2 is a flow chart showing a procedure for message transmission control processing performed by the mobile communication terminal shown in FIG. 1 and the contents of the procedure.
Figure 3:
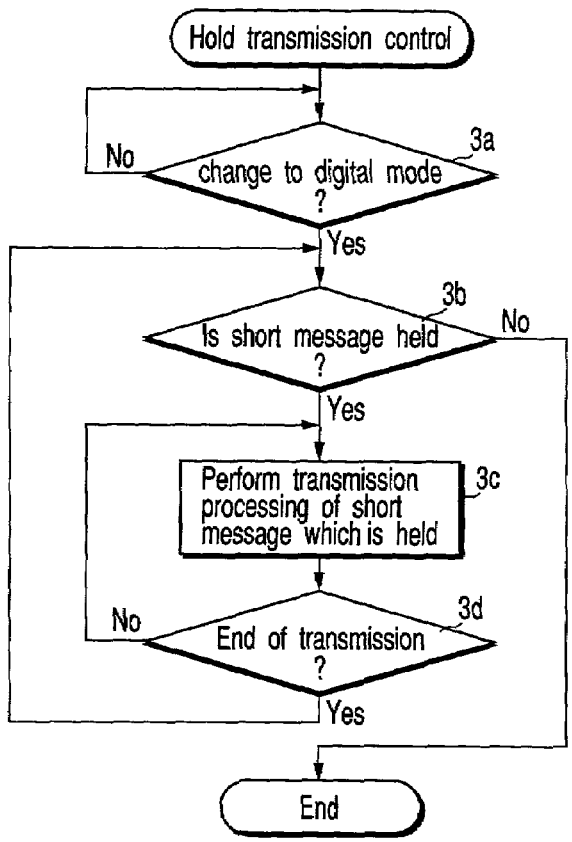
FIG. 3 is a flow chart showing a procedure for message hold transmission control processing performed by the mobile communication terminal shown in FIG. 1 and the contents of the procedure.
Figure 4:
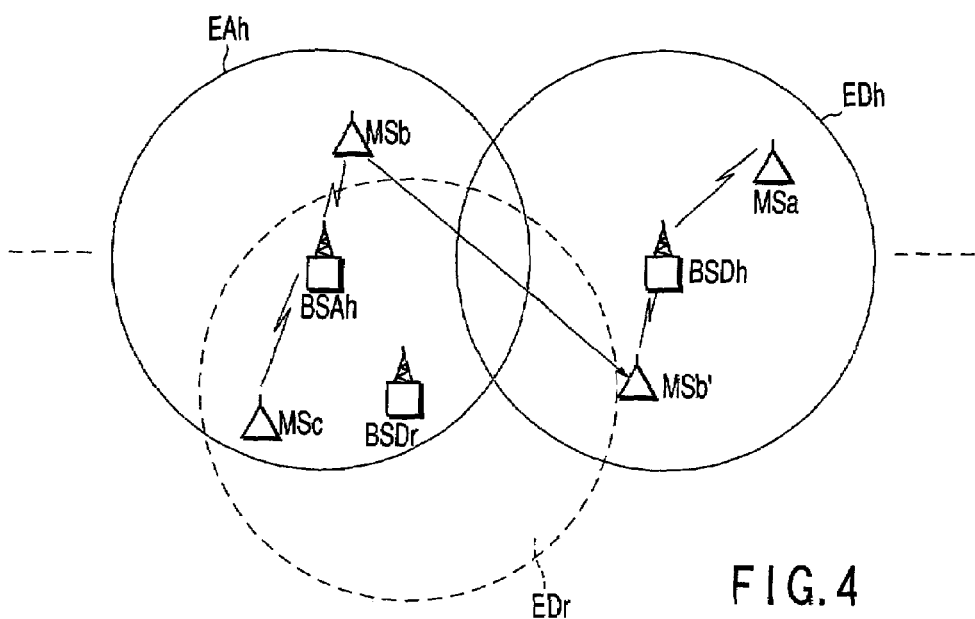
FIG. 4 is a view showing the schematic arrangement of a mobile communication system which is used to explain the operation of the mobile communication terminal shown in FIG. 1.

Short message transmitting operation by the portable telephone terminal having the above arrangement will be described next. FIGS. 2 and 3 are flow charts showing a control procedure for this operation and the contents of the control. FIG. 4 shows an arrangement of the mobile communication system.

Referring to FIG. 4, reference symbols BSAh and BSDh denote home analog and digital base stations, respectively; and BSDr, a roaming digital base station. These base stations respectively form radio areas EAh, EDh, and EDr called cells. Portable telephone terminals MSa, MSb, and MSc capture base stations in these radio areas EAh, EDh, and EDr and set in the standby state.

Assume that users operate the portable telephone terminals MSa, MSb, and MSc to create short messages. In this case, in step 2a, each CPU 12 displays a short message creation window on the LCD display 15, and performs short message creation processing in accordance with key input operation by the user afterward. When the user performs message transmitting operation upon creation of a message, the CPU 12 detects this operation in step 2b, and advances to step 2c to check whether the currently set standby mode is the digital or analog mode.

Assume that the portable telephone terminal MSa has performed short message transmitting operation in FIG. 4. Assume that this portable telephone terminal MSa is in the standby state while capturing the home digital base station BSDh. The CPU 12 advances from step 2c to step 2d to execute transmitting operation for the short message created in step 2a. When the transmission of the short message is completed, the CPU 12 detects the end of this transmission in step 2e and returns to the standby state.

Assume that the portable telephone terminal MSc has performed short message transmitting operation in FIG. 4. In this case, the CPU 12 of the portable telephone terminal MSc executes the following message transmission control processing.

Assume that the portable telephone terminal MSc is in the standby state while capturing the analog base station BSAh. In this case, the CPU 12 of the portable telephone terminal MSc advances from step 2c to step 2f to check whether a change of the communication mode is set to "valid" or "invalid". If it is determined that "valid" is set, the CPU 12 advances to step 2g to change the standby mode from "analog mode" to "digital mode". In step 2h, the CPU 12 searches the control channels of neighboring base stations to capture a base station that is broadcasting control signals in the digital mode. Referring to FIG. 4, for example, the portable telephone terminal MSc exists in the radio area EDr of the roaming digital base station BSDr. For this reason, the portable telephone terminal MSc is set in the standby state upon capturing a control signal from this roaming digital base station BSDr.

Upon successfully capturing the digital base station BSDr, the CPU 12 of the portable telephone terminal MSc advances from step 2i to step 2j to execute standby processing in the digital mode. In this processing, the CPU 12 displays a notification message indicating that the standby mode has been changed to "digital mode" on the LCD display 15. This displayed notification message allows the user to confirm that the standby mode has automatically been switched to "digital mode". The CPU 12 then advances to step 2d to execute transmitting operation for the short message previously created in step 2a. Upon transmission of the short message, the CPU 12 detects the end of this transmission in step 2e, and returns to the standby state.

In contrast to this, assume that a portable telephone terminal that exists at a position where it cannot capture a digital base station, like the portable telephone terminal MSb in FIG. 4, has performed transmitting operation for a short message.

In this case, the CPU 12 of the portable telephone terminal MSb executes the following message transmission control processing.

The CPU 12 of the portable telephone terminal MSb is in a standby state while capturing the analog base station BSAh. For this reason, the flow advances from step 2c to step 2f to check whether a change of the communication mode is set to "valid" or "invalid". If it is determined that the change is set to "valid", the CPU 12 advances to step 2g to change the standby mode to "digital mode". In step 2h, the control channels of neighboring base stations are searched to capture a digital mode base station.

In this state, it is assumed that the portable telephone terminal MSb, however, exists at a position where no digital base station can be captured. For this reason, the portable telephone terminal MSb cannot capture a control signal in the digital mode, and hence the CPU 12 advances from step 2i to step 2k. In step 2k, the CPU 12 checks whether the message transmission hold mode is set to "valid" or "invalid". If this mode is set to "invalid", the CPU 12 returns to the standby state without holding the transmission of a short message. In this case, a notification message indicating that short message transmission hold control operation is not performed may be displayed on the LCD display 15.

If the message transmission hold mode is set to "valid", the CPU 12 advances to step 2m to perform message transmission hold control processing. In this transmission hold control processing, a short message is stored in the hold message storage area 13b. In addition, a notification message indicating that the transmission of the short message is held is displayed on the LCD display 15. The flow then advances to hold transmission control processing.

When the flow advances to this hold transmission control processing, the CPU 12 of the portable telephone terminal MSb monitors in step 3a whether the standby mode has changed to the digital mode, as shown in FIG. 3.

Assume that the portable telephone terminal MSb has moved to the position of "MSb'" in FIG. 4. At this time, the portable telephone terminal MSb' executes handoff processing to switch the base station captured in the standby state from the analog base station BSAh to the digital base station BSDh.

The CPU 12 of the portable telephone terminal MSb' advances from step 3a to step 3b to check the presence/absence of a short message whose transmission is held. If a short message whose transmission is held is stored in the hold message storage area 13b, the flow advances to step 3c. In step 3c, the CPU 12 reads out the stored short message from the hold message storage area 13b, and transmits the read short message.

When transmission of one short message is completed in this manner, the CPU 12 advances from step 3d to step 3b to check whether any stored short message is left. If a short message that has not been transmitted is left, the CPU 12 reads out this short message from the hold message storage area 13b and transmits it in step 3c. Subsequently, the transmission control processing from step 3b to step 3d is repeatedly executed in the same manner as described above until all stored short messages are completely transmitted. When all the stored short messages are completely transmitted, a notification message indicating the corresponding information is displayed on the LCD display 15. If a short message that has not been transmitted is left, a notification message indicating the corresponding information is displayed on the LCD display 15.

As described above, in the portable telephone terminal according to this embodiment, when short message transmitting operation is performed, it is checked whether the standby mode is the digital or analog mode, and processing for changing the analog mode to the digital mode is executed if the standby mode is the analog mode. When a change to the digital mode is made, the above short message is transmitted through a digital channel. If the analog mode cannot be changed to the digital mode, the short message to be transmitted is stored in the hold message storage area 13b, and transmission control is executed on the hold message afterward.

According to this embodiment, therefore, when short message transmitting operation is performed while the standby mode is set to the analog mode, the standby mode is automatically changed from the analog mode to the digital mode. For this reason, the user need not perform any operation for changing the standby mode to the digital mode by himself/herself, and hence can easily transmit the short message.

If the standby mode cannot be changed to the digital mode, hold transmission control processing is performed. If it is detected that the standby mode is changed to the digital mode in this hold transmission control processing, the short message stored at this time is read out and transmitted. Therefore, the user need not create a short message and perform transmitting operation again after the standby mode is changed to the digital mode. This makes it possible to easily transmit a short message without any delay.

Furthermore, in this embodiment, mode change processing is executed only when change processing of the standby mode is set to "valid", and transmission of a short message is stopped when this change processing is set to "invalid". If, therefore, the user does not want to connect his/her terminal to a roaming digital base station, the mode change processing is set to "invalid". This inhibits automatic switching to a roaming digital base station.

In addition, according to this embodiment, hold transmission control processing for a short message is executed only when the message transmission hold mode is set to "valid", and hold transmission control processing for a short message is not performed when this mode is set to "invalid". For this reason, if the user need not transmit a short message any more as in a case where the method of making contact with a distant user is switched from the method of using a short message to the method of using a telephone, he/she sets the message transmission hold mode to "invalid" to inhibit unnecessary hold transmission control processing.

Note that the present invention is not limited to the above embodiment. For example, in the above embodiment, communication mode change control is started in accordance with short message transmitting operation. However, communication mode change control may be started in accordance with the operation of starting creation of a short message. This makes it possible to perform communication mode change control during creation of a short message, thus quickening the transmission timing of the short message.

In the embodiment described above, when a short message cannot be transmitted, the short message is stored in the memory and hold transmission control is executed. When, however, a short message cannot be transmitted, short message transmission control processing may be terminated without executing hold transmission control processing. In this case, however, only a short message that has not been transmitted may be stored.

The above embodiment has exemplified transmission control on a short message. However, the present invention is not limited to this. For example, the present invention can be applied to a case where a user operates a portable telephone terminal to receive electronic mail addressed to himself/herself and stored in a mail server.

In addition, the type and arrangement of the mobile communication terminal, the type of communication mode, and the procedures and contents of the mail transmission/reception control processing, mode change control processing, and hold transmission control processing can be variously modified within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal capable of selectively communicating with a first base station and a second base station, wherein the first base station corresponds to a first communication mode providing voice communication and mail communication, and the second base station corresponds to a second communication mode providing voice communication and not providing mail communication, the terminal, comprising:
    selecting means for selecting one of the first and second communication modes;
    detecting means for detecting a mail request;
    first determining means for determining whether the selected communication mode is the first communication mode capable of communicating mail or the second communication mode incapable of communicating mail, if the mail request is detected by the detecting means;
    first setting means for selectively setting a mode change status;
    change means for making an attempt to change the selected communication mode to the first communication mode based on the mode change status, if the determining means determines that the selected communication mode is the second communication mode;
    second determining means for determining whether the selected communication mode has been changed to the first communication mode; and
    storage control means for, if the selected communication mode has not been changed to the first communication mode, storing the mail detected by the detecting means in a storage of the mobile communication terminal.

2. The terminal according to claim 1, further comprising:
    means for determining whether the selected communication mode is changed to the first communication mode; and
    means for, when the selected communication mode is changed to the first communication mode, notifying a user of said mobile communication terminal of the changing to the first communication mode.

3. A terminal according to claim 1, further comprising:
    means for determining whether the selected communication mode is changed to the first communication mode; and
    means for, when the selected communication mode is not changed to the first communication mode, notifying a user of said mobile communication terminal of the not changing to the first communication mode.

4. The terminal according to claim 1, further comprising:
   means for determining whether the selected communication mode is changed to the first communication mode; and
   means for, when the selected communication mode is not changed to the first communication mode, causing said control means to perform processing for changing the selected communication mode to the first communication mode again.

5. The terminal according to claim 1, further comprising notifying means for notifying a user of said mobile communication terminal of the storing the mail if the storage control means stores the mail in the storage.

6. The terminal according to claim 1, further comprising:
   means for determining whether the selected communication mode is changed to the first communication mode while the mail is stored; and
   transmission control means for, when the selected communication mode is changed to the first communication mode while the mail is stored, reading out the stored mail and transmitting the read out mail.

7. The terminal according to claim 6, further comprising:
   means for determining whether transmission of the stored mail is completed; and
   means for, when transmission of the stored mail is completed, notifying a user of said mobile communication terminal of the transmission completion.

8. The mobile communication terminal according to claim 1, wherein:
   the mode change status is set by the first setting means to one of "invalid" and "valid";
   the change means does not make the attempt if the mode change status is set to "invalid," even if the first determining means determines that the selected communication mode is the second communication mode; and
   the change means makes the attempt if the mode change status is set to "valid."

9. The mobile communication terminal according to claim 1, further comprising:
   second setting means for selectively setting a mail transmission hold status, wherein the storage control means selectively stores the detected mail based on the mail transmission hold status.

10. The mobile communication terminal according to claim 9, wherein:
    the hold status is set by the second setting means to one of "invalid" and "valid";
    the storage control means does not store the detected mail if the hold status is set to "invalid," even if the selected communication mode has not been changed to the first communication mode; and
    the storage control means stores the detected mail if the hold status is set to "valid."

11. A mobile communication terminal capable of selectively communicating with a first base station and a second base station, wherein the first base station corresponds to a first communication mode providing voice communication and mail communication, and the second base station corresponds to a second communication mode providing voice communication and not providing mail communication, the terminal, comprising:
    selecting means for selecting one of the first and second communication modes;
    detecting means for detecting a mail request of communicating with a mail;
    determining means for, when the mail request is detected by said detecting means, determining whether the selected communication mode is the first communication mode capable of communicating mail or the second communication mode incapable of communicating mail;
    setting means for selectively setting a mode change status;
    control means for, when said determining means determines that the selected communication mode is the second communication mode, changing the selected communication mode from the second communication mode to the first communication mode based on the mode change status;
    means for determining whether the selected communication mode has been changed to the first communication mode; and
    storage control means for, if the selected communication mode has not been changed to the first communication mode, storing the mail detected by the detecting means in a storage of the mobile communication terminal.

12. A mobile communication terminal capable of selectively communicating with a first base station and a second base station, wherein the first base station corresponds to a first communication mode providing voice communication and mail communication, and the second base station corresponds to a second communication mode providing voice communication and not providing mail communication, the terminal, comprising:
    a selecting section configured to select one of the first and second communication modes;
    a detecting section configured to detect a mail request of communicating with a mail;
    a first determining section configured to determine whether the selected communication mode is the first communication mode capable of communicating mail or the second communication mode incapable of communicating mail, when the mail request is detected by said detecting section;
    a setting section configured to selectively set a mode change status;
    a control section configured to make an attempt to change the selected communication mode based on the mode change status, when said determining section is determines that the selected communication mode is the second communication mode;
    a second determining section configured to determine whether the selected communication mode has been changed to the first communication mode; and
    a storage control section configured to store the mail in a storage of the mobile communication terminal, if the selected communication mode has not been changed to the first communication mode.

13. The terminal according to claim 12, further comprising:
    a third determining section configured to determine whether the selected communication mode has been changed to the first communication mode while the mail is stored; and
    a transmission section configured to read out the stored mail and transmit the read out mail, if the selected communication mode has been changed to the first communication mode.

14. A mobile communication terminal capable of selectively communicating with a first base station and a second base station, wherein the first base station corresponds to a first communication mode providing voice communication and mail communication, and the second base station corresponds to a second communication mode providing voice communication and not providing mail communication, the terminal, comprising:

a selecting section configured to select one of the first and second communication modes;

a detecting section configured to detect a mail request of communicating with a mail;

a first determining section configured to determine whether the selected communication mode is the first communication mode capable of communicating mail or the second communication mode incapable of communicating mail, when the mail request is detected by said detecting section;

a setting section configured to selectively set a mode change status;

a control section configured to change the selected communication mode from the second communication mode to the first communication mode based on the mode change status, when said first determining section determines that the selected communication mode is the second communication mode;

a second determining section configured to determine whether the selected communication mode has been changed to the first communication mode; and a storage control section configured to store the mail in a storage of the mobile communication terminal, if the selected communication mode has not been changed to the first communication mode.

15. A mobile communication terminal capable of selectively communicating with a first base station and a second base station, wherein the first base station corresponds to a first communication mode providing voice communication and mail communication, and the second base station corresponds to a second communication mode providing voice communication and not providing mail communication, the terminal, comprising:

a selecting section configured to select one of the first and second communication modes;

a detecting section configured to detect a service request;

a first determining section configured to determine whether the selected communication mode is the first communication mode capable of providing the service or the second communication mode incapable of providing the service, if the service request is detected by the detecting section;

a setting section configured to selectively set a mode change status;

a control section configured to make an attempt to change the selected second communication mode to the first communication mode based on the mode change status, if the determining section determines that the selected communication mode is the second communication mode;

a second determining section configured to determine whether the selected communication mode has been changed to the first communication mode; and a storage control section configured to store the service request in a storage of the mobile communication terminal, if the selected communication mode has not been changed to the first communication mode.

16. The mobile communication terminal according to claim 15, further comprising:

a third determining section configured to determine whether the selected communication mode has been changed to the first communication mode while the service request is stored; and a transmission section configured to read the stored service request and executing the service request, if the selected communication mode has been changed to the first communication mode.

17. A mobile communication terminal capable of selectively communicating with a first base station and a second base station, wherein the first base station corresponds to a first communication mode providing voice communication and mail communication, and the second base station corresponds to a second communication mode providing voice communication and not providing mail communication, the terminal, the terminal comprising:

selecting means for selecting one of the first and second modes;

detecting means for detecting a mail request comprising a request to send a mail message;

first determining means for, when the mail request is detected, determining whether the selected mode is the first mode or the second mode;

change means for, when a mail request is detected and if the selected mode is determined to be the second mode, attempting to change the selected mode to the first mode;

second determining means for, after attempting to change the selected mode to the first mode, determining whether the selected mode has been changed to the first mode; and storage control means for, if the selected mode has not been changed to the first mode, storing the mail message in a storage of the terminal.

* * * * *

UNITED STATES PATENT AND TRADEMARK OFFICE
CERTIFICATE OF CORRECTION

PATENT NO. : 7,403,776 B2 Page 1 of 1
APPLICATION NO. : 10/105430
DATED : July 22, 2008
INVENTOR(S) : Suetaka et al.

It is certified that error appears in the above-identified patent and that said Letters Patent is hereby corrected as shown below:

Claim 12, column 10, lines 42-43, change "section is determines" to --section determines--.

Claim 17, column 12, lines 28-29, change "the terminal, the terminal comprising:" to --the terminal comprising:--.

Signed and Sealed this

Sixteenth Day of September, 2008

JON W. DUDAS
*Director of the United States Patent and Trademark Office*